United States Patent
Ben-Natan et al.

(10) Patent No.: US 12,153,661 B2
(45) Date of Patent: Nov. 26, 2024

(54) DELEGATING MULTI-FACTOR AUTHENTICATION IN LEGACY DATABASES

(71) Applicant: Imperva, Inc., San Mateo, CA (US)

(72) Inventors: Ron Ben-Natan, San Mateo, CA (US); Gabriel Beyo, San Mateo, CA (US); Rosa Miroshnikov, San Mateo, CA (US); Ury Segal, San Mateo, CA (US)

(73) Assignee: Imperva, Inc., San Mateo, CA (US)

( * ) Notice: Subject to any disclaimer, the term of this patent is extended or adjusted under 35 U.S.C. 154(b) by 334 days.

(21) Appl. No.: 17/677,941

(22) Filed: Feb. 22, 2022

(65) Prior Publication Data

US 2022/0269769 A1 Aug. 25, 2022

Related U.S. Application Data

(60) Provisional application No. 63/152,015, filed on Feb. 22, 2021.

(51) Int. Cl.
*G06F 21/40* (2013.01)
*G06F 21/41* (2013.01)
*G06F 21/78* (2013.01)

(52) U.S. Cl.
CPC .................... *G06F 21/40* (2013.01)

(58) Field of Classification Search
CPC .. G06F 21/40; G06F 2221/2113; G06F 21/45; G06F 21/41; G06F 21/78; H04L 2463/082; H04L 63/0884
See application file for complete search history.

(56) References Cited

U.S. PATENT DOCUMENTS

| | | | | |
|---|---|---|---|---|
| 8,776,190 B1* | 7/2014 | Cavage | ............... | G06F 21/62 380/255 |
| 2008/0155651 A1* | 6/2008 | Wasmund | ............... | G06F 21/55 726/2 |
| 2014/0245396 A1* | 8/2014 | Oberheide | ............... | G06F 21/40 726/4 |
| 2015/0295913 A1* | 10/2015 | Foote | ............... | G06F 21/31 726/6 |
| 2019/0205511 A1* | 7/2019 | Zhan | ............... | H04L 63/1416 |
| 2021/0218735 A1* | 7/2021 | Kübler | ............... | H04L 63/0838 |

* cited by examiner

*Primary Examiner* — Amie C. Lin (57) ABSTRACT

Embodiments of the present disclosure relate to utilizing an existing login process of a data repository to enable the data repository to delegate MFA functionality to an external MFA system. When a purported user attempts to log in to the data repository, a delegation module within the login process may insert a record into a table associated with the login process. A program executing on a security device external to the data repository may periodically poll the table for new records and upon detecting the new record, may call the external MFA system to verify the login attempt. The external MFA system may indicate to the program whether the login attempt was verified and the program may update the table with the indication. Upon detecting the indication, the delegation module may complete or terminate the login attempt based on the indication.

19 Claims, 6 Drawing Sheets

|  | USER RECORD 305 | STATUS 310 |
|---|---|---|
| ROW 1 | RECORD 1 | APPROVED |
| ROW 2 |  |  |
| ROW 3 |  |  |
| ROW 4 |  |  |
| ROW 5 |  |  |
| ROW 6 |  |  |
| ROW 7 |  |  |

DELEGATING MULTI-FACTOR AUTHENTICATION IN LEGACY DATABASES

CROSS REFERENCE TO RELATED APPLICATIONS

This application claims priority to, and the benefit of, U.S. Provisional Application No. 63/152,015, filed on Feb. 22, 2021, and entitled "Delegating Multi-Factor Authentication in Legacy Databases", which is hereby incorporated herein by reference in its entirety.

TECHNICAL FIELD

Aspects of the present disclosure relate to enterprise database systems, and more particularly, to providing multi-factor authentication for enterprise database systems.

BACKGROUND

A data repository may refer to any appropriate storage system such as an object storage system (e.g., Amazon S3™ system), a database, a filesystem, and a cloud storage layer, for example. Data repositories rely on access control systems to ensure that access is granted only to those people (database system users) who are allowed to access such data and that access may be restricted to unauthorized persons. One of the primary functions performed by the access control system is authorization. Authorization determines whether a user should be allowed to access the data or make the transaction they are attempting to make. Many types of systems utilize multi-factor authentication (MFA) to provide an additional layer of security. Some such systems involve a single sign on system where a user signs on centrally and the system performs all types of authentication. However, this type of system seldom exists on a data repository.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

There are numerous issues involved with authentication and authorization as they pertain to privileged users accessing data repositories (e.g. database administrators). Generally, username/password authentication does not provide adequate security for these "root" data repository accounts. Because most attacks happen by somebody hijacking a privileged account, and misusing those privileges, MFA is needed to provide an additional layer of security. Many data repositories (e.g., legacy data repositories) may not natively support multi-factor authentication (MFA). Some of these data repositories may have the capability to integrate with external MFA systems.

There are 2 general approaches to integrating with external MFA systems. One approach involves an authentication server (e.g., a SAML server), which may sit between the user and the repository, and may provide a login system that is responsible for login and authentication of users. Users may visit the authentication server first before being authenticated and redirected to the data repository. The authentication server may be responsible for all authentication including MFA. In some examples, the authentication server may generate a token which may be used by every system that relies on the authentication server to authenticate users.

The second approach involves a user connecting to the data repository directly, wherein the data repository includes logic to delegate the MFA functionality to another system to perform the authentication.

However, many data repositories do not have the capability to integrate with external MFA systems and may be left with few or no alternative options for providing this extra layer of security.

The present disclosure addresses the above-noted and other deficiencies by providing a system that utilizes an existing login process of a data repository to enable the data repository to delegate the MFA functionality to an external MFA system. The existing login process of the data repository may include a delegation module to enable the data repository to delegate the MFA functionality to an external MFA system. The login process may be any appropriate process that is called during the login sequence of the data repository, and within which the code can run within the context of the login sequence. When a purported user attempts to log in to the data repository, the delegation module (executing within the login process) may insert a record into a table (located within the data repository) associated with the login process. The record may indicate a user identity (ID) of the purported user attempting to login and a time stamp of the login attempt.

A program executing on a security device external to the data repository may periodically poll the table for new records. When the second program detects the new record, it may make a call to the external MFA system (e.g., the Duo™ authentication system) to verify (e.g., approve or deny) the login attempt. The external MFA system may authenticate the login attempt in any appropriate manner and may send a notification indicating whether the login attempt was approved or denied to the program. The program may update the table with the indication. The delegation module may monitor the table periodically and upon detecting the indication, may complete or terminate the login attempt based on the indication.

Figure 1:
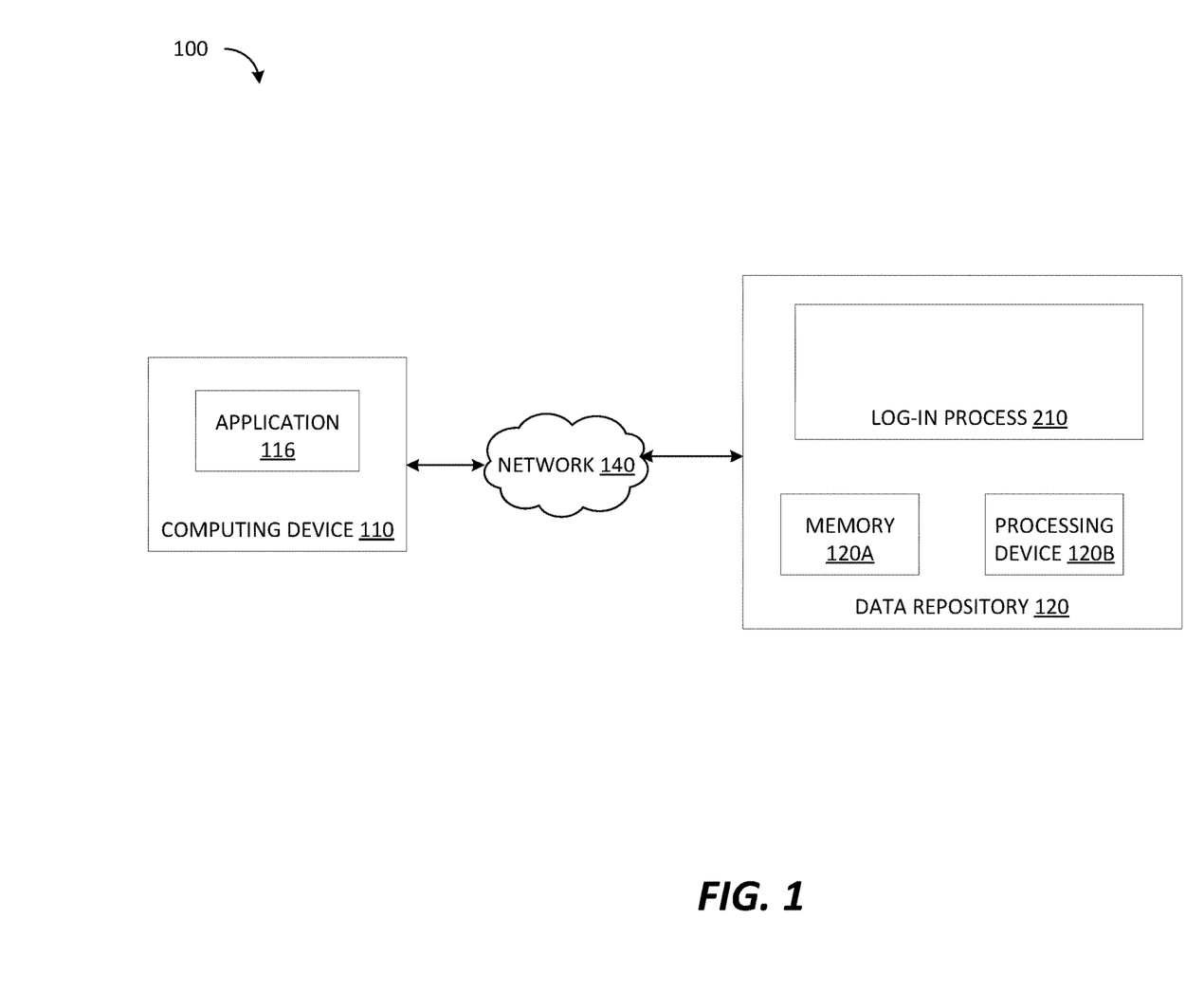
FIG. 1 is a block diagram that illustrates an example system, in accordance with some embodiments of the present disclosure.

FIG. 1 is a block diagram that illustrates an example system 100. As illustrated in FIG. 1, the system 100 includes computing device 110, data repository 120, and a network 140. The computing device 110 and the data repository 120 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and data repository 120. The computing device 110 and data repository 120 may each include hardware such as processing device 120B (e.g., processors, central processing units (CPUs)), memory 120A (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In addition to the memory 120A and the processing device 120B, the data repository 120 may comprise one or more additional storage devices (e.g., hard-disk drive (HDD), and solid-state drives (SSD), etc.) for implementing any appropriate type of storage system.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 110 and data repository 120 may each comprise any suitable type of computing device or machine that has a programmable processor including, for example, server computers, desktop computers, laptop computers, tablet computers, smartphones, set-top boxes, etc. In some examples, the computing device 110 and data repository 120 may each comprise a single machine or may include multiple interconnected machines (e.g., multiple servers configured in a cluster). The computing device 110 and data repository 120 may be implemented by a common entity/organization or may be implemented by different entities/organizations. For example, computing device 110 may be operated by a first company/corporation and data repository 120 may be operated by a second company/corporation. The computing device 110 and data repository 120 may each execute or include an operating system (OS) (not shown in the FIGS.), as discussed in more detail below. The OSs of computing device 110 and data repository 120 may manage the execution of other components (e.g., software, applications, etc.) and/or may manage access to the hardware (e.g., processors, memory, storage devices etc.) of the computing device.

As illustrated in FIG. 1, computing device 110 may run an application 116 which may allow a user to interact with data repository 120. When the user wants to access the data repository 120, they may utilize application 116 (which may be e.g., a client w/ a graphical user interface (GUI)) to connect to the data repository 120, and make calls to the data repository 120 (e.g., queries). The data repository 120 may further comprise any appropriate type of storage system such as an object storage system, a database, a filesystem, or a cloud storage layer, for example. However, as discussed above, legacy data repositories that do not natively support or integrate with MFA systems may be vulnerable to attacks that hijack privileged accounts to access the data repository 120.

Figure 2:
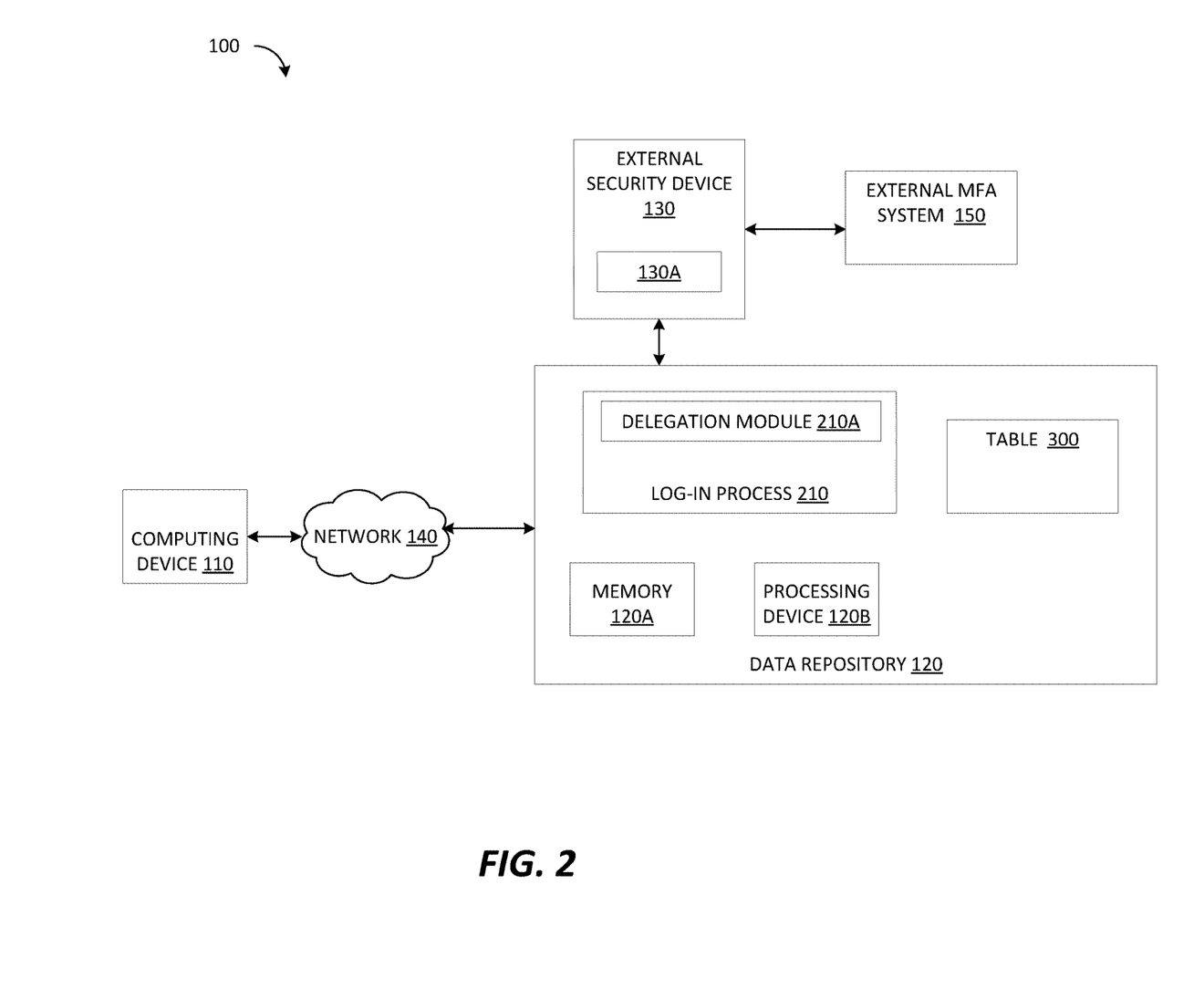
FIG. 2 is a block diagram that illustrates an example system, in accordance with some embodiments of the present disclosure.

FIG. 2 illustrates the system 100 in accordance with some embodiments of the present disclosure. As can be seen, FIG. 2 illustrates system 100 with external security device 130 coupled to the data repository 120. The external security device 130 may be a computing device similar to computing device 110, and may include a monitoring module 130A which may be logic executed in order to perform some aspects of the embodiments described herein.

FIG. 2 illustrates the data repository 120 and a login process 210 thereof. The login process 210 may be one process among a number of processes that form an overall login sequence and may execute (e.g., is called) in response to a purported user attempting to login to the data repository 120. For example, the login process 210 may correspond to a login trigger (activated when a user logs-on). In another example, the login process 210 may correspond to a login exit, which may call an external procedure that can perform various functionalities. The login process 210 may normally be used to perform a variety of functions e.g., create an audit trail, or ensure that inbound connections to the data repository 120 only come from certain IP addresses. Embodiments of the present disclosure may utilize a login process 210 that may include (e.g., is modified with) a delegation module 210A that may perform the embodiments described herein. More specifically, the delegation module 210A may mimic MFA delegation functionality to allow the data repository 120 (which cannot natively delegate MFA functionality) to delegate this functionality. Via the login process 210, the delegation module 210A may run within the context of the overall login sequence.

Upon a user attempting to log in to the data repository 120, an API call to the login process 210 may be triggered. In some embodiments, the API call to the login process 210 may be a synchronous call, where execution of code will block (i.e., wait) for the API call to return before continuing. Stated differently, until a response is returned by the API, the overall login sequence will not execute any further. This may be beneficial as the delay in the overall login sequence will provide additional time for the delegation module 210A to delegate the MFA functionality, as discussed herein in further detail. However, allowing the data repository 120 to make calls to external components may create a security vulnerability. For example, a malicious actor may inject harmful code into the data repository 120 while it is sending sensitive data to an external system. Because it is undesirable for the data repository 120 to make external calls, the login process 210 (via the delegation module 210A) may insert a record into a new row of a table 300 (also illustrated in FIG. 3) associated with the data repository 120. The record may indicate a user ID of the purported user attempting to login and the time stamp of the attempted login.

Figure 3:
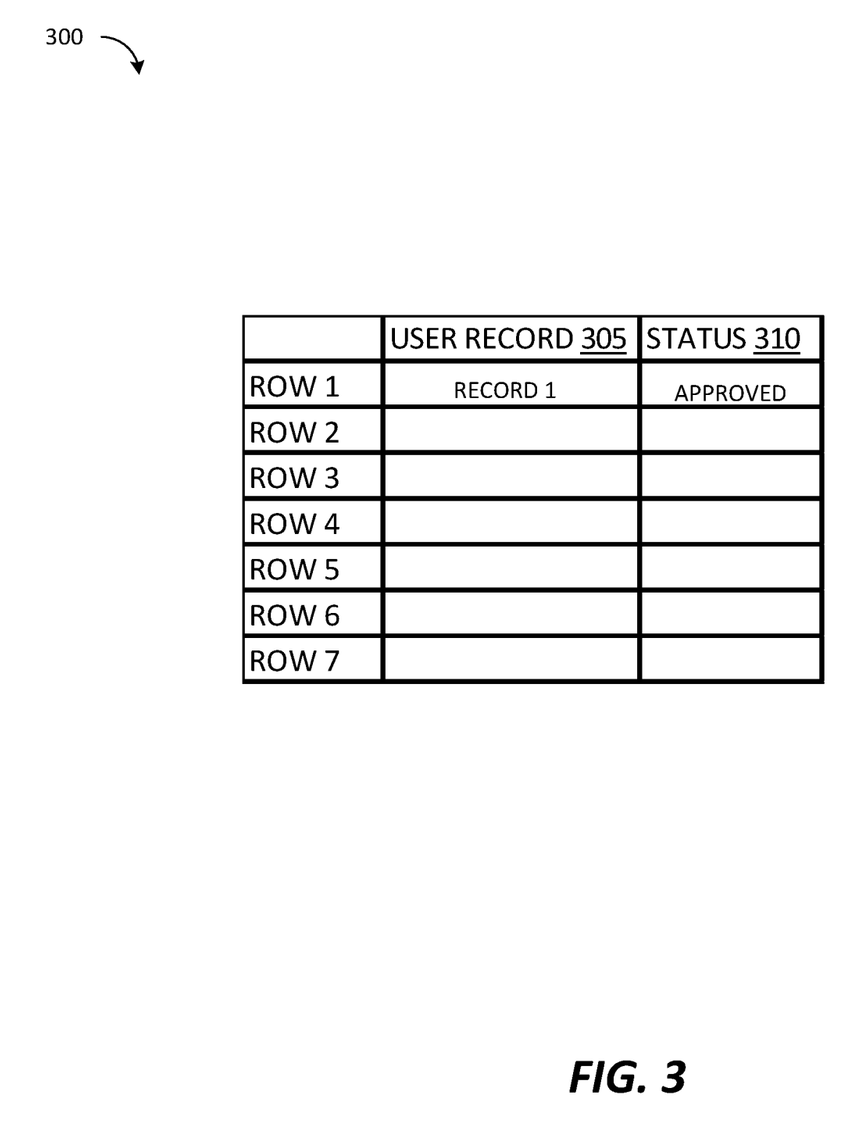
FIG. 3 is a diagram illustrating an example login attempt status table, in accordance with some embodiments of the present disclosure.

FIG. 3 illustrates the table 300, in accordance with some embodiments of the present disclosure. The table 300 may include a first column referred to as user record column 305, a second column referred to as the status column 310, and a number of rows 1-7. The user record column 305 may be dedicated to records associated with login attempts, and the status column 310 may be dedicated to indications of whether the login attempts of the corresponding record were authenticated. Referring simultaneously to FIGS. 2 and 3, when a purported user attempts to log in to the data repository 120, an API call to login process 210 (which includes delegation module 210A) may be triggered. The login process 210 (via the delegation module 210A) may write a record (record 1) having a user ID of the purported user attempting to login and the time stamp of the attempted login, in a new row (e.g., row 1) in the user record column 305, as shown.

The external security device 130 may include the monitoring module 130A, which is perpetually connected to the data repository 120 and may periodically poll the table 300 for new records (e.g., by monitoring for new rows). The monitoring module 130A may maintain a mapping of users to user IDs, which is similar to a mapping of users to user IDs maintained by the external MFA system 150. When monitoring module 130A detects the new record (record 1), it may issue a call to the external MFA system 150 (e.g., Duo™) to ping the user mapped to the user ID in record 1 in order to authenticate the login attempt.

The external MFA system 150 may ping the user in any appropriate manner. For example, the external MFA system 150 may send an authentication request to a corresponding application running on a device (not shown in the FIGS) of the user corresponding to the user ID. If the user approves (or denies) the login attempt (e.g., the user selects "accept" on their phone), the external MFA system 150 may receive a notification of this, and make an API call to the monitoring module 130A with an indication of whether or not the user successfully authenticated the login attempt. In response, the monitoring module 130A may update row 1 of the status column 310 with the indication. Because the login process 210 is synchronous, it may (via the delegation module 210A) periodically monitor the status column 310 of row 1 (the same row it just inserted the record 1 into the user record column of) for a pre-defined period of time (e.g., 30 seconds). If an indication that the user approved the login attempt is detected within the status column 310 within the pre-defined period of time, then the login process 210 may determine that the purported user is in fact the user corresponding to the user ID, and allow the login attempt to complete. Otherwise, the login process 210 may terminate the login attempt.

In some embodiments, the call to the login process 210 may be an asynchronous call, wherein the overall login sequence cannot be paused. Thus, the login attempt may be allowed to complete, while the login process 210 completes the steps described above to authenticate the login attempt. If the login attempt is authenticated (i.e., an indication that the user approved the login attempt is detected within the status column 310 within the pre-defined period of time), then the login process 210 may take no action. However, if the login attempt is not authenticated, then the login process 210 may terminate the purported user's (computing device 110's) connection to the data repository 120.

Figure 4:
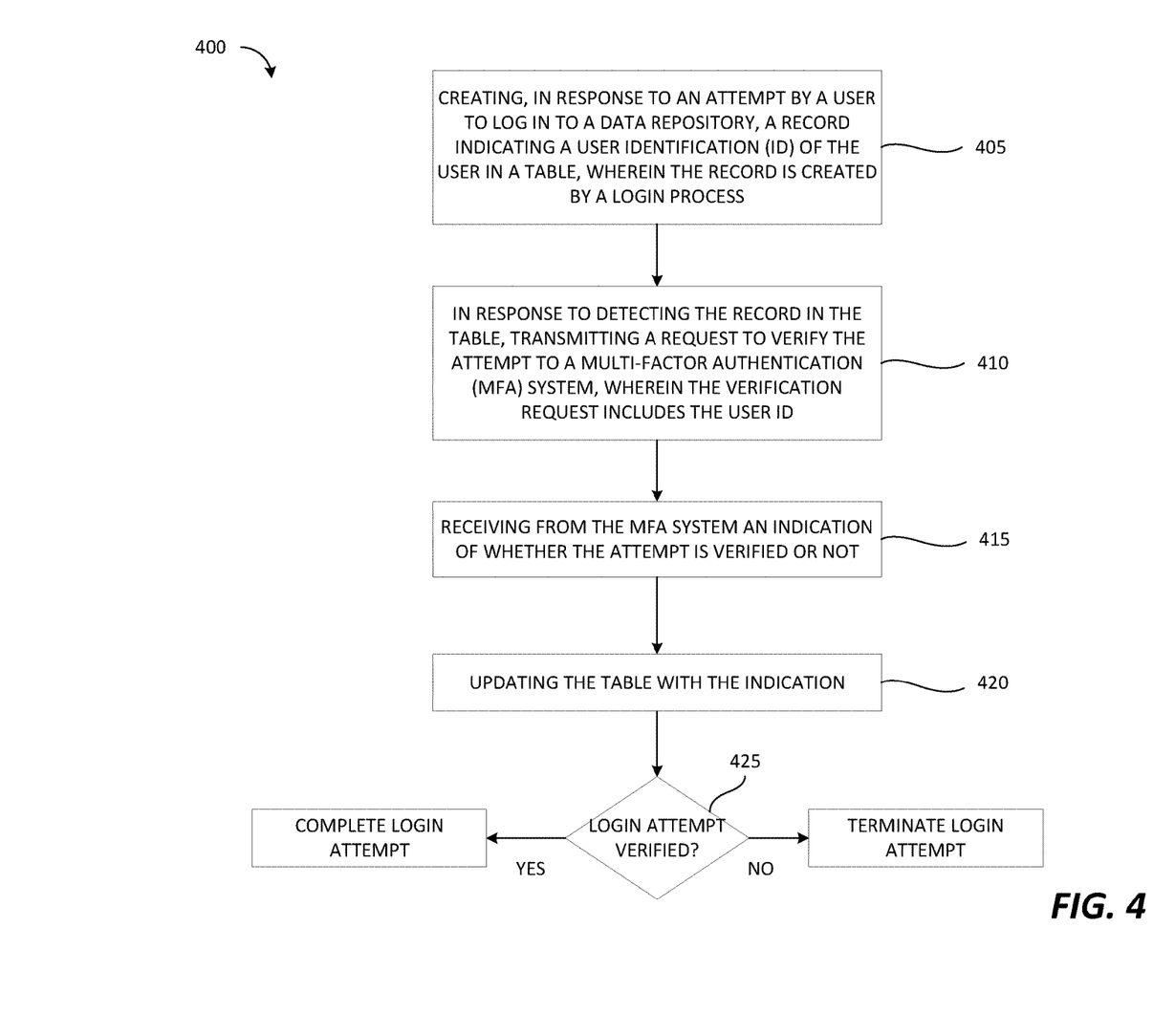
FIG. 4 is a flow diagram of a method of enabling a data repository to delegate MFA functionality to an external system, in accordance with some embodiments of the present disclosure.

FIG. 4 is a flow diagram of a method 400 for providing MFA delegation capability to a data repository using a synchronous login process, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by e.g., data repository 120 and external security device 130 illustrated in FIG. 2.

At block 405, the login process 210 may create, in response to an attempt by a user to log in to the data repository 120, a record indicating a user identification (ID) of the user in a table, wherein the record is created by a login process. Referring also to FIGS. 2 and 3, when a purported user attempts to log in to the data repository 120, an API call to login process 210 (which includes delegation module 210A) may be triggered. The login process 210 (via the delegation module 210A) may write a record (record 1) having a user ID of the purported user attempting to login and the time stamp of the attempted login, in a new row (e.g., row 1) in the user record column 305, as shown.

The external security device 130 may include the monitoring module 130A, which is perpetually connected to the data repository 120 and may periodically poll the table 300 for new records (e.g., by monitoring for new rows). The monitoring module 130A may maintain a mapping of users to user IDs, which is similar to a mapping of users to user IDs maintained by the external MFA system 150. At block 410, in response to the monitoring module 130A detecting the new record (record 1), it may issue a call to the external MFA system 150 (e.g., Duo™) to ping the user mapped to the user ID in record 1 in order to authenticate the login attempt.

The external MFA system 150 may ping the user in any appropriate manner. For example, the external MFA system 150 may send an authentication request to a corresponding application running on a device (not shown in the FIGS) of the user corresponding to the user ID. If the user approves (or denies) the login attempt (e.g., the user hits "accept" on their phone), the external MFA system 150 may receive a notification of this and make an API call to the monitoring module 130A with an indication of whether or not the user successfully authenticated the login attempt. At block 415, the monitoring module 130A may receive the indication and in response, at block 420, the monitoring module 130A may update row 1 of the status column 310 with the indication. Because the login process 210 is synchronous, it may (via the delegation module 210A) periodically monitor the status column 310 of row 1 (the same row it just inserted the record 1 into the user record column of) for a pre-defined period of time (e.g., 30 seconds). At block 425, if an indication that the user approved the login attempt is detected within the status column 310 within the pre-defined period of time, then the login process 210 may determine that the purported user is in fact the user corresponding to the user ID, and allow the login attempt to complete. Otherwise, the login process 210 may terminate the login attempt.

Figure 5:
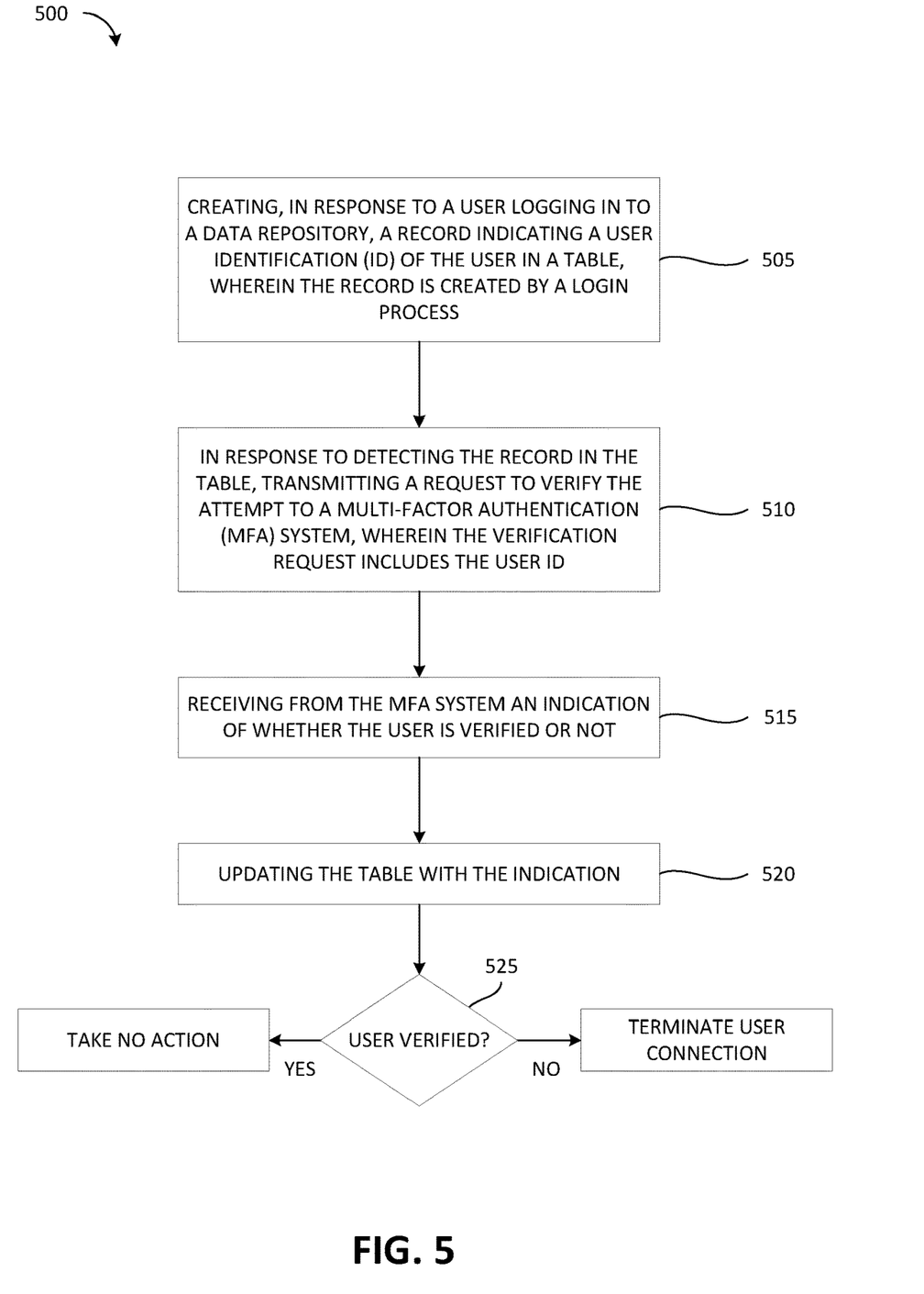
FIG. 5 is a flow diagram of a method of enabling a data repository to delegate MFA functionality to an external system, in accordance with some embodiments of the present disclosure.

FIG. 5 is a flow diagram of a method 500 for providing MFA delegation capability to a data repository using an asynchronous login process, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by e.g., data repository 120 and external security device 130 illustrated in FIG. 2.

At block 505, the login process 210 may create, in response to a user logging in to data repository 120, a record indicating a user identification (ID) of the user in a table, wherein the record is created by a login process. Referring also to FIGS. 2 and 3, when a purported user logs in to the data repository 120, an API call to login process 210 (which includes delegation module 210A) may be triggered. The login process 210 (via the delegation module 210A) may write a record (record 1) having a user ID of the purported user and the time stamp of the login, in a new row (e.g., row 1) in the user record column 305, as shown.

The external security device 130 may include the monitoring module 130A, which is perpetually connected to the data repository 120 and may periodically poll the table 300 for new records (e.g., by monitoring for new rows). The monitoring module 130A may maintain a mapping of users to user IDs, which is similar to a mapping of users to user IDs maintained by the external MFA system 150. At block 510, in response to the monitoring module 130A detecting the new record (record 1), it may issue a call to the external MFA system 150 (e.g., Duo™) to ping the user mapped to the user ID in record 1 in order to authenticate the login attempt.

The external MFA system 150 may ping the user in any appropriate manner. For example, the external MFA system 150 may send an authentication request to a corresponding application running on a device (not shown in the FIGS) of the user corresponding to the user ID. If the user approves (or denies) the login (e.g., the user hits "accept" on their phone), the external MFA system 150 may receive a notification of this and make an API call to the monitoring module 130A with an indication of whether or not the user successfully authenticated the login. At block 515 the monitoring module 130A may receive the indication and in response, at block 520, the monitoring module 130A may update row 1 of the status column 310 with the indication. The login process 210 may (via the delegation module 210A) periodically monitor the status column 310 of row 1 (the same row it just inserted the record 1 into the user record column of) for a pre-defined period of time (e.g., 30 seconds). At block 525, if an indication that the user approved the login is detected within the status column 310 within the pre-defined period of time, then the login process 210 may determine that the purported user is in fact the user corresponding to the user ID, and take no action. Otherwise, the login process 210 may terminate the purported user's connection to the data repository 120.

Figure 6:
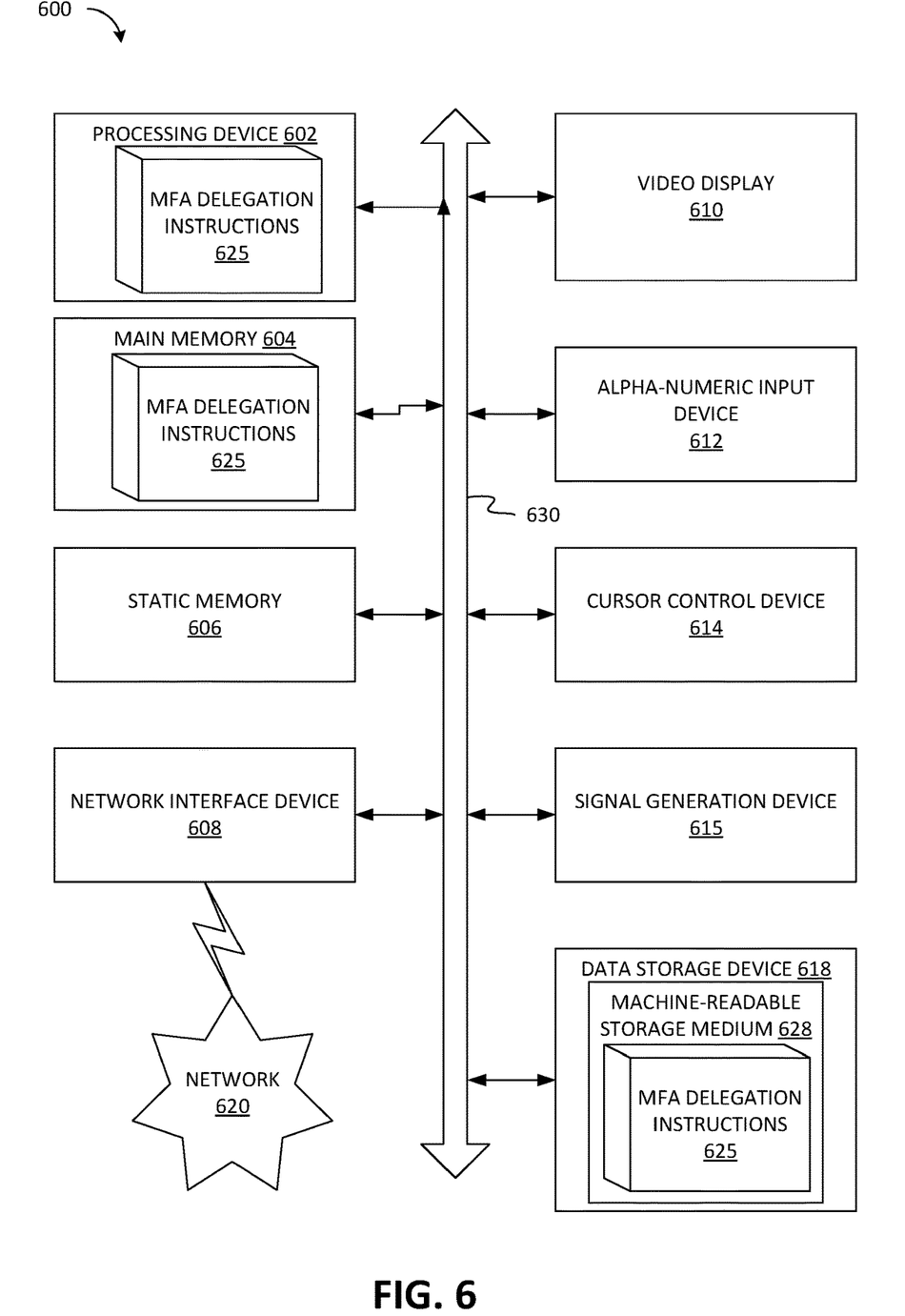
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for generating a high level security policy.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The example computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute MFA delegation instructions 625, for performing the operations and steps discussed herein.

The data storage device 615 may include a machine-readable storage medium 628, on which is stored one or more sets of MFA delegation instructions 625 (e.g., software) embodying any one or more of the methodologies of functions described herein. The MFA delegation instructions 625 may also reside, completely or at least partially, within the main memory 604 or within the processing device 602 during execution thereof by the computer system 600; the main memory 604 and the processing device 602 also constituting machine-readable storage media. The MFA delegation instructions 625 may further be transmitted or received over a network 620 via the network interface device 608.

The machine-readable storage medium 628 may also be used to store instructions to perform a method for delegation MFA functionality to an external MFA system, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
providing a modified login process for a data repository, the modified login process to delegate multi-factor authentication (MFA) functionality;
in response to a login attempt to the data repository by a user, delegating the MFA functionality to an external MFA system and inserting a record of the login attempt into a table of the data repository;
in response to detecting the record of the login attempt in the table, issuing a call to the external MFA system to authenticate the login attempt;
in response to determining that the external MFA system has authenticated the login attempt, completing the login attempt; and
monitoring the table for new records using a security device that is external to and perpetually connected to the data repository and the external MFA system, wherein the call to the external MFA system to authenticate the login attempt is issued by the security device.

2. The method of claim 1, further comprising:
in response to determining that the external MFA system has not authenticated the login attempt, terminating the login attempt.

3. The method of claim 1, wherein monitoring the table for new records comprises determining whether new rows have been added to the table.

4. The method of claim 1, wherein determining that the external MFA system has authenticated the login attempt comprises:
determining that a status column of the record of the login attempt has been updated to indicate that the login attempt was authenticated.

5. The method of claim 4, wherein the record of the login attempt indicates a user identity (ID) of the user and a time stamp of the login attempt.

6. The method of claim 5, wherein authenticating the login attempt comprises:
transmitting by an external MFA system, an authentication request to a device associated with the user ID;
receiving an indication of authentication from the device associated with the user ID; and transmitting an API call to the security device with an indication that the user successfully authenticated the login attempt.

7. The method of claim 6, wherein in response to receiving the API call from the external MFA system, the security device updates the status column of the record of the login attempt to indicate that the login attempt was authenticated.

8. The method of claim 1, wherein the modified login process comprises a process that executes in response to any attempt to login to the data repository.

9. The method of claim 1, wherein the modified login process comprises a login exit.

10. A system comprising:
an external multi-factor authentication (MFA) system;
a data repository to:
provide a modified login process for a data repository, the modified login process to delegate multi-factor authentication (MFA) functionality;
in response to a login attempt to the data repository by a user, delegate the MFA functionality to an external MFA system and inserting a record of the login attempt into a table of the data repository; and
in response to determining that the external MFA system has authenticated the login attempt, complete the login attempt; and
a security device external to and perpetually connected to the data repository and the external MFA system, wherein the security device,
in response to detecting the record of the login attempt in the table, issues a call to the external MFA system to authenticate the login attempt.

11. The system of claim 10, wherein the data repository is further to:
in response to determining that the external MFA system has not authenticated the login attempt, terminate the login attempt.

12. The system of claim 10, wherein the security monitors the table for new records.

13. The system of claim 12, wherein to monitor the table for new records, the security device determines whether new rows have been added to the table.

14. The system of claim 10, wherein to determine that the external MFA system has authenticated the login attempt, the data repository is to:
determine that a status column of the record of the login attempt has been updated to indicate that the login attempt was authenticated.

15. The system of claim 14, wherein the record of the login attempt indicates a user identity (ID) of the user and a time stamp of the login attempt.

16. The system of claim 15, wherein to authenticate the login attempt, the external MFA system:
transmits an authentication request to a device associated with the user ID;
receives an indication of authentication from the device associated with the user ID; and
transmits an API call to the security device with an indication that the user successfully authenticated the login attempt.

17. The system of claim 16, wherein security device in response to receiving the API call from the external MFA system, updates the status column of the record of the login attempt to indicate that the login attempt was authenticated.

18. The system of claim 10, wherein the modified login process comprises a process that executes in response to any attempt to login to the data repository.

19. The system of claim 10, wherein the modified login process comprises a login exit.

* * * * *